United States Patent [19]

Saad et al.

[11] Patent Number: 4,800,127

[45] Date of Patent: Jan. 24, 1989

[54] THERMAL SHOCK RESISTANT SILICONE COATING COMPOSITION

[75] Inventors: William T. Saad, Burnt Hills; George F. Medford, Ballston Lake, both of N.Y.

[73] Assignee: General Electric Company, Waterford, N.Y.

[21] Appl. No.: 30,954

[22] Filed: Mar. 26, 1987

[51] Int. Cl.$^4$ .................. B32B 19/02; B32B 9/04; C08K 3/34

[52] U.S. Cl. .................. 428/447; 428/324; 524/449

[58] Field of Search ................. 428/324, 447; 524/449

[56] References Cited

U.S. PATENT DOCUMENTS

| | | | |
|---|---|---|---|
| 3,126,357 | 3/1964 | Liebig | 524/449 |
| 4,130,599 | 12/1978 | Merrill et al. | 428/447 X |
| 4,293,677 | 10/1981 | Imai | 428/447 X |

Primary Examiner—George F. Lesmes
Assistant Examiner—Susan S. Rucker
Attorney, Agent, or Firm—John W. Harbour

[57] ABSTRACT

Thermal shock resistant silicone coating formulations are disclosed to contain polydiorganosiloxane fluid, silicone resin and mica.

26 Claims, No Drawings

THERMAL SHOCK RESISTANT SILICONE COATING COMPOSITION

The present invention relates to thermal shock resistant silicone coating compositions. More particularly, the present invention relates to thermal shock resistant silicone coating compositions containing certain silicone fluids and mica.

BACKGROUND OF THE INVENTION

Silicone compositions are used in a variety of protective coating applications. Such silicone compositions are particularly useful as coatings where the coated substrate is exposed to high temperatures. For example, boiler stacks, wood stoves, flues, and the like are heated substrates which would quickly degrade ordinary acrylic or epoxy based coatings. However, the high temperature stability of silicone polymers make these materials ideal for application in these high temperature situations.

Generally silicone coating compositions are produced from silicone resins which are highly branched and crosslinked silicone polymers. To these silicone resins, polydiorganosilicone fluids are added to modify certain properties of the resin. Polydiorganosiloxane fluids are substantially linear silicone polymers having functional groups which will react with the silicone resin.

Although silicone coatings are chemically stable at high temperature, full advantage of longer lifetime due to this chemical stability often cannot be taken because the coating fails physically under thermal shock conditions. For example, a silicone coating on a boiler stack at 800° F. which would otherwise be expected to have a 5 year service life will peel and fail as a result of thermal shock from a rain storm.

Thus, it is an object of the present invention to produce thermal shock resistant silicone coatings compositions.

It is another object of the present invention to produce objects coated with thermal shock resistant silicone coating compositions.

It is still another object of the present invention to produce silicone based paints which are resistant to thermal shock failure.

SUMMARY OF THE INVENTION

Briefly, according to the present invention, there is provided a coating composition useful at high temperatures comprising:

(a) at least one silicone resin having reactive functional groups.

(b) a thermal shock improving amount of at least one polydiorganosiloxane fluid having a viscosity between about 5 and 5,000 centipoise at 25° C. and having functional groups which will react with the reactive functional groups of the silicone resin, (c) a thermal shock improving amount of ground or flaked mica, and (d) an effective amount of condensation catalyst to cure the composition.

DETAILED DESCRIPTION OF THE INVENTION

Silicone resins suitable for use herein have from about 0.5 to about 30% by weight reactive functional groups and may be broadly described by the general formula:

$$R_a SiO_{(4-a)/2} \tag{1}$$

wherein R is a substituted or unsubstituted hydrocarbon radical of from 1 to about 10 carbon atoms, and "a" is on average from about 0.75 to about 1.9. Examples of hydrocarbon radicals included by R are alkyl radicals such as methyl, ethyl, n-propyl, isopropyl, n-butyl and sec-butyl radicals as well as octyl radicals; cycloalkyl radicals such as the cyclopentyl, cyclohexyl and cycloheptyl radicals; alkenyl radicals such as the vinyl and allyl radicals; aryl radicals such as the phenyl radical; alkaryl radiicals such as the tolyl radical; and aralkyl radicals such as the benzyl radical. Examples of substituted hydrocarbon radicals represented by R are the halogenated monovalent hydrocarbon radicals such as the 1,1,1-trifluoropropyl and the alpha, alpha, alpha-trifluorotolyl radical as well as chlorophenyl and dichlorophenyl radicals. However, because they are more readily available, it is preferred that at least 85 percent of the R radicals be methyl or phenyl radicals and that at least 50 percent of the R radicals be methyl radicals. Examples of reactive functional groups are groups which substitute a hydroxy group, an alkoxy group, or an olefinic group for a portion of the siloxane units in the above formula. Preferred reactive functional groups are condensable groups which are silicon bonded hydroxyl groups and silicon bonded alkoxy groups having from 1 to 8 carbon atoms such as the previously mentioned alkyl radicals.

Preferred silicone resins may be classified as either MQ resins, i.e. resins containing $R_3SiO_{1/2}$ and $SiO_{4/2}$ units, or DT resins, i.e. resins containing $R_2SiO_{2/2}$ and $RSiO_{3/2}$ units. It is especially preferred that the instant invention be practiced with DT resins.

MQ resins, which include MDQ resins, are described along with methods for their preparation in U.S. Pat. Nos. 2,676,182 to Daudt et al.; 2,398,672 to Sauer; 2,736,721 to Dexter; and 2,857,356 to Goodwin, all of which are incorporated by reference into the present disclosure. Briefly, an MQ resin is a copolymer having $R_3SiO_{0.5}$ and $SiO_2$ units wherein the ratio of $R_3SiO_{0.5}$ units to $SiO_2$ units is from about 0.25:1 to about 0.8:1. MDQ resins are copolymers having $R_3SiO_{0.5}$ units, $R_2SiO$ units, and $SiO_2$ units, wherein the ratio of $R_3SiO_{0.5}$ units to $SiO_2$ units is from 0.25:1 to 0.8:1 and the ratio of $R_2SiO$ units to $SiO_2$ units can be up to about 0.11:1. In the foregoing formulas, R can be any alkyl radical, aryl radical, aralkyl radical, alkaryl radical, alkenyl radical, or a halogen or cyano derivative thereof.

DT resins as well as their methods of preparation are also known in the art and are described, for example, in U.S. Pat. Nos. 3,135,713 to Brewer et al.; 3,786,015 to Merrill et al.; 3,846,358 to Roedel; 4,026,868 to Merrill; and 4,160,858, 4,239,877 and 4,4766,291 to Roedel, all of which are incorporated herein by reference.

As stated above, it is preferred that the reactive functional groups of the silicone resin be present in an amount of from about 0.5 percent by weight to about 30 percent by weight. Preferably however, such groups should be present in an amount from about 1 percent by functional weight to about 10 percent by weight. Of course, where an alkoxy or acyloxy group contains more than 1 carbon atom, then the reactive functional group content may even exceed 30 percent by weight. The most preferred embodiments of the invention utilize hydroxyl groups, methoxy groups, or a mixture thereof as the reactive functional groups of the silicone resin.

The polidiorganosiloxane fluid can be any substantially linear silicone polymer which contains functional groups which will react with the functional groups of the silicone resin. These polydiorganosiloxane fluids and their methods of manufacture are well known to those of ordinary skill in the art. Preferably, the reactive functional groups will be the same as those of the silicone resin, for example silanol, alkoxy, acyloxy and the like. Of course, if the reactive functional groups of the silicone resin are olefinic, such as vinyl or allyl, the reactive functional groups of the polydiorganosiloxane are preferably hydrogen atoms.

Especially preferred polydiorgansiloxane fluids contain terminal reactive functional groups and preferably are of the general formula

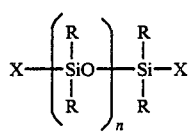

(2)

where R is defined above; X is a hydrolyzable reactive group such as hydroxy, alkoxy and acyloxy or an addition curable group such as hydrogen; and n is an integer such that the viscosity of the polydiorganosiloxane is from about 5 centipoise to about 5,000 centipoise at 25° C. In more preferred embodiments of the present invention the viscosity of the polydiorganosiloxane fluid is from about 25 centipoise to about 1000 centipoise at 25° C. and, most preferably, is from about 50 centipoise to about 500 centipoise as 25° C.

To form the coating compositions herein, the polydiorganosiloxane fluid should be compatible with the silicone resins in order to obtain optimum properties in the cured coating. When the polydiorganosiloxane fluid and silicone resin are compatible, a clear composition is formed and no phase separation is observed. Compatibility of the resin and fluid is improved where substantially the same R groups or organo substituents are present on each. For example, where the resin contains phenyl groups, compatibility will be improved where the fluid is phenyl containing. Compatibility is also improved upon decreasing the silicone chain length of the fluid. Additionally, a solvent may make the composition compatible. Persons skilled in the art can simply and easily recognize an incompatible composition from a compatible composition.

X in the formula 2 is preferably condensable and can be, for example, hydroxy, methoxy, propoxy, butoxy, acetoxy, or the like, recognizing that any group other than hydroxy should not be so difficult to hydrolyze that reaction rates are unreasonably slow. It should also be understood, however, that the fastest rate of reaction is not necessarily the best, for example, in the case of a paint formulation wherein a slower reacting paint gives a higher gloss in the cured state than a faster curing paint.

For the advantages of the present invention, it is necessary to add only an amount of polydiorganosiloxane fluid to the silicone resin to increase the thermal shock properties of the combination. However, the fluid effects other properties of the resin which may make it advantageous to add more than the minimum amount. Thus, broadly, it is recommended that from about 1 to about 1000 parts by weight of fluid be added for each 100 parts by weight of resin. However, for coating formulations herein, its is advantageous that from about 50 to about 500 parts by weight of fluid be added to each 100 parts by weight of resin.

Mica suitable for use herein, is either ground or flake mica having a particle less than about 600 micrometers, i.e. about 30 mesh. Preferably, for economy's sake, the particle size should be about 250 to about 50 micrometers or about 60 to about 325 mesh. Very small particle sizes are available, 5 to 20 micrometers or 3000 to 625 mesh, but not preferred for reasons including cost. For use herein, natural or synthetic micas are suitable, including muscovite, phlogopite, biotite, and others.

Mica should be added to coating compositions of the instant invention at least in an amount sufficient to increase the thermal shock properties of the coated and cured composition. To accomplish this, at least about 1 part by weight mica should be added for each 100 parts by weight of silicone resin and polydiorganosiloxane fluid. Preferably, from about 5 to about 100 parts by weight mica should be added for each 100 parts by weight of silicone resin and polydioragnosiloxane fluid.

Where the reactive functional groups are condensable, suitable condensation catalysts may be the same as those which have been employed heretofore in the production of coatings from thermosetting organopolysiloxane compositions. Examples of suitable condensation catalysts are lead compounds such as lead carbonate, basic lead carbonate, i.e., a compound corresponding to the formula $Pb_3(OH)_2(CO_3)_2$, lead carboxylic acid salts of zirconium, calcium, aluminum, iron, zinc, tin, cobalt and/or cerium, such as zirconium-2-ethylhexoate, zinc naphthenate, zinc-2-ethylhexoate, tin octoate, dibutyltin diacetate, cobalt octoate, ferric naphthenate, calcium stearate, cobalt naphthenate, aluminum naphthenate, cerium octoate and cerium naphthenate; quaternary ammonium compounds such as tetramethylammoniumacetate; and metal alcoholates such as aluminum isopropylate and polymeric butyltitanate. Mixtures of various condensation catalysts may also be employed. When condensation catalysts are used, they may be employed in the same amounts as those used heretofore in the manufacture of coatings from thermosetting compositions containing organopolysiloxanes and condensation catalyst will range from about 0.005 to 5 percent by weight based on the weight of the organopolysiloxanes.

Where the reactive functional groups are addition curable, the preferred catalyst is platinum or a platinum complex. Other suitable addition catalysts will occur to those skilled in the art.

The curable coating compositions of the present invention are prepared by simply mixing the silicone resin, the polydiorganosiloxane fluid, the mica, the condensation catalyst and a suitable solvent. In some instances, mixing can be accomplished by stirring or slight shaking while in other instances, high energy mechanical blending may be required. Should the blend separate prior to use, additional mixing will restore the blend to its original intimately admixed condition.

Generally, the coating compositions of the present invention are applied in sufficient solvent to allow for easy application by spraying or brushing. Noting that environmental requirements demand reduced solvent use, the coating compositions are applied at from about 50 to about 100 weight percent solids. The solvent may be any of the conventional hydrocarbon solvents, for example, isopropanol or toluene.

The coating is applied to a substrate by conventional methods, such as dipping, spraying, knifing or the like to a cured thickness of from about 0.5 to about 5 mils and allowed to air dry for from 1 minute to about 1 hour. After air drying, the coating contains less solvent and for some formulations is no longer tacky, however, further curing at elevated temperatures is required. Such further curing is normally accomplished by placing the coated or impregnated substrate in an oven maintained at a temperature of from about 50° C. to about 300° C. for about 1 minute to about 3 hours or by simply heating the substrate to which the coating is applied.

Substrates on which the coating compositions of the present invention find the most advantage are those which are exposed to temperatures in excess of about 500° F. Generally, these substrates are metal substrates, such as steel, aluminum, copper and the like. Certain high temperature plastics may also be expected to withstand these temperatures.

Ingredients

Silicone Resin A—A silicone resin containing 98% by number $CH_3SiO_{3/2}$ units, 2% by number $(CH_3)_2SiO_{2/2}$ units, and from 2 to 8% by weight —OH groups.

Silicone Resin B—A silicone resin containing 95% by number a 1/1 mixture of $(C_6H_5)SiO_{3/2}$ and $CH_3SiO_{3/2}$ units, 5% by number $(CH_3)_2SiO_{2/2}$ units and 2 to 8% by weight —OH groups.

Silicone Fluid—A silicone fluid containing a mixture of polydimethylsiloxanes of 3–10 siloxane units the total mixture having 3–14% by weight of —OH groups on terminal silicon atmos Catalyst A—Zinc octoate complex Catalyst B—Zirconium octoate complex Mica - 325 mesh mica, muscovite Solvent - 1/1 weight ratio of toluene to isopropanol

EXAMPLES

Examples 1–4

The following formulations were produced in the indicated proportions, parts by weight, by simply mixing the ingredients as shown in Table 1. The resultant mixtures were spray coated onto stainless steel panels and cured in an oven at 482° F. for 1 hour to produce a cured coating of from 0.7 to 2.5 mils in thickness. The temperature of each steel panel was raised for the thermal shock testing first to 550° F. and each panel was immersed in a room temperature 76F water bath. Following immersion, the coating was inspected for cracks or loss of adhesion. If no significant cracking or adhesion loss was observed then the panel was "passed" and the temperature of the oven raised by 50° F. or 100° F. as indicated to repeat the procedure. The procedure is repeated for each panel up to 1000° F. until the panel exhibits substantial cracking or adhesion loss and is rated "fail".

TABLE 1

|  | 1 | 2 | 3 | 4 |
|---|---|---|---|---|
| Resin B | 100 | 100 | 100 | 100 |
| Silicone Fluid | — | — | 300 | 300 |
| Mica | — | 100 | — | 100 |
| Catalyst A, metal weight | 1.6 | 1.6 | — | — |
| Catalyst B, metal weight | — | — | 0.2 | 0.2 |
| Solvent | 100 | 100 | 100 | 100 |

TABLE 1-continued

|  | 1 | 2 | 3 | 4 |
|---|---|---|---|---|
| Thermal Shock Pass, °F. | — | 600 | 550 | 1000 |
| Thermal Shock Fail, °F. | 550 | 650 | 600 | — |

Examples 5–8

The procedure of Examples 1–4 was repeated for the Formulations of Table 2.

TABLE 2

|  | 5 | 6 | 7 | 8 |
|---|---|---|---|---|
| Resin A | 100 | 100 | 100 | 100 |
| Silicone Fluid | — | — | 300 | 300 |
| Mica | — | 100 | — | 100 |
| Catalyst B, metal weight | 0.2 | 0.2 | 0.2 | 0.2 |
| Solvent | 100 | 100 | 100 | 100 |
| Thermal Shock Pass, °F. | — | 800 | 550 | 1000 |
| Thermal Shock Fail, °F. | 550 | 900 | 600 | — |

What is claimed is:

1. An article of manufacture comprising:
   (a) a substrate having applied to the surface thereof
   (b) a coating comprising the reaction products of a mixture of
   (i) at least one silicone resin having reactive functional groups,
   (ii) a thermal shock improving amount of at least one polydiorganosiloxane fluid having a viscosity between about 5 and 5,000 centipoise at 25° C. and having functional groups which will react with the reactive funtional groups of the silicone resin,
   (iii) a thermal shock improving amount of ground or flaked mica, and
   (iv) an effective amount of catalyst, to cure the composition.

2. The article of claim 1 wherein the substrate is selected from the group consisting of copper aluminum and steel.

3. The article of claim 1 wherein said coating has a thickness of from about 0.5 to about 5 mils.

4. The article of claim 1 wherein the polydiorganosiloxane fluid has a viscosity of from about 50 to about 500 centipoise at 25° C.

5. The article of claim 1 exposed to temperatures in excess of about 500° F.

6. The article of claim 1 wherein said polydiorganosiloxane fluid and said silicone resin are compatible in said mixture.

7. The article of claim 6 wherein the polydiorganosiloxane fluid and the silicone resin have substantially the same organo substituents to render said resin and fluid compatible.

8. The article of claim 6 wherein sufficient solvent is added to said mixture to render said resin and fluid compatible.

9. The article of claim 1 wherein said silicone resin has the general formula:

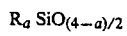

$$R_a SiO_{(4-a)/2}$$

wherein R is a substituted or unsubstituted hydrocarbon radical of from 1 to about 10 carbon atoms, "a" is on average from about 0.75 to about 1.9, and the resin has an average from about 0.5 to about 30% by weight reactive functional groups selected from condensable groups and olefinic groups.

10. The article of claim 1 wherein the polydiorganosiloxane fluid has the general formula:

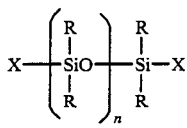

wherein R is a substituted or unsubstituted hydrocarbon radical of from 1 to about 10 carbon atoms; X is selected from the group of hydroxy, alkoxy, acyloxy and hydrogen; and n is an integer to give the required viscosity.

11. A coating composition comprising:
(i) at least one silicone resin having reactive functional groups,
(ii) a thermal shock improving amount of at least one polydiorganosiloxane fluid having a viscosity between about 5 and 5,000 centipoise at 25° C. and having functional groups which will react with the reactive functional groups of the silicone resin,
(iii) a thermal shock improving amount of ground of flaked mica, and
(iv) an effective amount of catalyst to cure the composition.

12. The composition of claim 11 which additionally contains sufficient solvent to facilitate application.

13. The coating composition of claim 11 wherein the polydiorganosiloxane fluid has a viscosity of from about 25 to about 1000 centipoise at 25° C.

14. The coating composition of claim 11 wherein the polydiorganosiloxane fluid has a viscosity of from about 50 centipoise to about 500 centipoise at 25° C.

15. The composition of claim 11 wherein said polydiorganosiloxane fluid and said silicone resin are compatible in said mixture.

16. The composition of claim 15 wherein said polydiorganosiloxane fluid and said silicone resin have substantially the same organo substitutents to render said resin and said fluid compatible.

17. The composition of claim 15 wherein the mixture contains sufficient solvent to render said resin and said fluid compatible.

18. The composition of claim 11 wherein said silicone resin has the general formula:

$R_aSiO_{(4-a)/2}$ wherein R is a substituted or unsubstituted hydrocarbon radical of from 1 to about 10 carbon atoms, "a" is on average from about 0.75 to about 1.9, and the resin has an average from about 0.5 to about 30% by weight reactive functional groups selected from condensable groups and olefinic groups.

19. The composition of claim 11 wherein the polydioragnosiloxane fluid has the general formula:

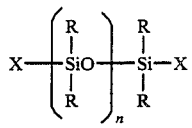

wherein R is a substituted or unsubstituted hydrocarbon radical of from 1 to about 10 carbon atoms; X is selected from the group of hydroxy, alkoxy, acyloxy and hydrogen; and n is an integer to give the required viscosity.

20. A coating composition comprising:
(i) at least one silicone resin having the formula:

$R_aSiO_{(4-a)/2}$ wherein R is a substituted or unsubstituted hydrocarbon radical of from 1 to about 10 carbon atoms, "a" is on average from about 0.75 to about 1.9, and the resin has on average from about 0.5 to about 30% by weight reactive functional groups selected from condensable groups and oelfinic groups;
(ii) a thermal shock improving amount of at least one polydiorganosiloxane fluid having the formula:

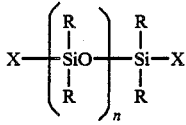

wherein R is a substituted or unsubstituted hydrocarbon radical of from 1 to about 10 carbon atoms, X is a functional group which will react with the reactive functional groups of the silicone resin and is selected from the group consisting of hydroxy, alkoxy, acyloxy and hydrogen, and n is an integer to give a viscosity between about 5 and about 5000 centipoise;
(iii) a thermal shock improving amount of ground or flaked mica; and
(iv) an effective amount of catalyst to cure the composition.

21. The article of claim 1 wherein said reactive functional groups are condensable groups.

22. The composition of claim 11 wherein said reactive functional groups are condensable groups.

23. The composition of claim 20 wherein said reactive functional groups are condensable groups.

24. The article of claim 1 wherein said silicone resin contains phenyl groups.

25. The composition of claim 11 wherein said silicone resin contains phenyl groups.

26. The composition of claim 25 wherein said silicone resin contains phenyl groups.

* * * * *